(No Model.)

A. J. IANSON.
TIRE SETTER AND COOLER.

No. 486,932.  Patented Nov. 29, 1892.

Witnesses  
Harry L. Amer.  
Chas. S. Hyer

Inventor  
A. J. Ianson.  
By his Attorneys,  
C. A. Snow & Co.

UNITED STATES PATENT OFFICE.

ALFRED J. IANSON, OF WAVERLY, WASHINGTON.

TIRE SETTER AND COOLER.

SPECIFICATION forming part of Letters Patent No. 486,932, dated November 29, 1892.

Application filed March 16, 1892. Serial No. 425,135. (No model.)

*To all whom it may concern:*

Be it known that I, ALFRED J. IANSON, a citizen of the United States, residing at Waverly, in the county of Spokane and State of Washington, have invented a new and useful Tire Setter and Cooler, of which the following is a specification.

My invention relates to new and useful improvements in tire setters and coolers; and it consists in a construction and arrangement and general combination of the several parts, as will be hereinafter more fully described, and particularly pointed out in the claim.

The object of my invention is to provide a device of the character set forth, of simple and effective construction, adapted to be readily and conveniently handled, and cheaply manufactured.

Figure 1:
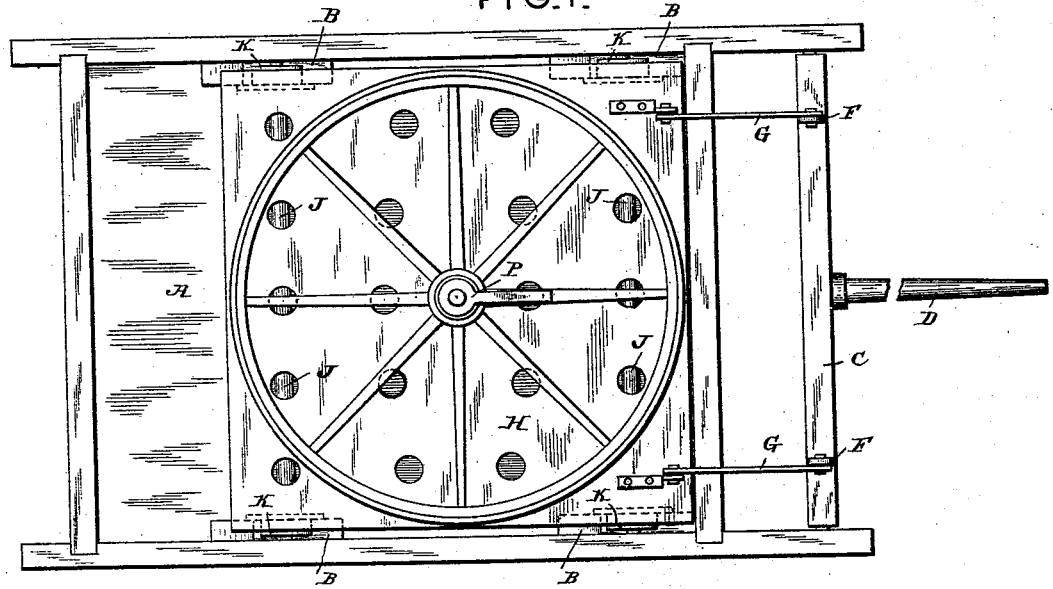
Figure 2:
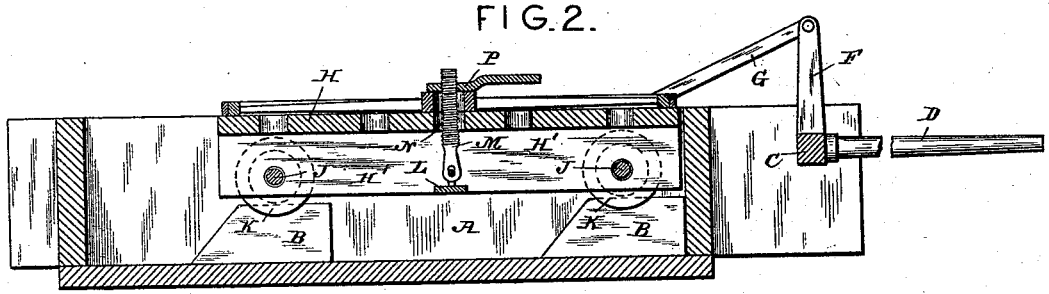
Figure 3:
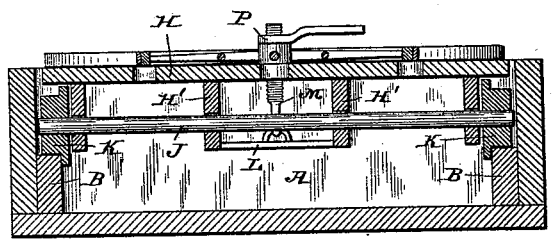

In the drawings, Figure 1 is a plan view of my improved tire setter and cooler, showing a wheel applied thereto and adapted to be lowered into the cooling receptacle or box. Fig. 2 is a longitudinal vertical section of my improved device. Fig. 3 represents a transverse section of the same.

Referring to the drawings, A designates a water-tight box or receptacle having on each of its sides a pair of inclines B, which are oppositely situated in parallel planes. In one end of the water-tight box or receptacle A is journaled a rock-shaft C, having an operating-handle D and arms F, to which are pivotally connected links G. A platform H is provided and has one end thereof connected to said links G. The said platform is formed with a number of perforations and has secured to the bottom thereof a number of longitudinal braces or bolsters H', which form bearings for axles J, carrying rollers or wheels K on their ends, adapted to have movement on the inclines B, hereinbefore referred to. A cross-strip L is secured to the central braces or bolsters H' and has a bolt M movably attached thereto, which projects upwardly through a central opening N in the platform H. The upper end of said bolt is screw-threaded and receives a hand-nut P, for a purpose hereinafter set forth.

In operation the platform H is raised by operating the rock-shaft C through the medium of its handle D and held on the top portions of the inclines B, which are made level to form a support for the rollers or wheels K. The wheel, with its applied heated tire, is then placed on the platform H, with the bolt M extending through the hub. The hand-nut P is then turned down against said hub to securely hold the wheel in position on said platform. The platform is then lowered into the box or receptacle A, which has been previously filled with water, and the tire is thereby set and cooled.

The advantages and conveniences arising from the use of my improved device are readily apparent and need not be further explained herein.

Having thus described my invention, what I claim as new is—

In a tire setter and cooler, the combination of a water box or receptacle having inclines on opposite sides thereof nearer to one end than to the other and formed with level or flap top portions and rear inclined ends, a perforated platform of less length than the said box or receptacle and mounted on the said inclines, said platform being provided with rollers and with a central bolt and clamp, and a rock-shaft connected to said platform for operating the same, substantially as described.

In testimony that I claim the foregoing as my own I have hereto affixed my signature in the presence of two witnesses.

ALFRED J. IANSON.

Witnesses:
 CHAS. FISHER,
 W. H. LAMBERT.